United States Patent [19]
Holly

[11] 3,750,232
[45] Aug. 7, 1973

[54] MOLDING APPARATUS
[75] Inventor: Harry H. Holly, Olympia Fields, Ill.
[73] Assignee: Hollymatic Corporation, Olympia Fields, Ill.
[22] Filed: Feb. 25, 1972
[21] Appl. No.: 229,407

[52] U.S. Cl. ............................................... 17/32
[51] Int. Cl. ........................................... A22c 7/00
[58] Field of Search .................. 17/32; 425/251, 252

[56] References Cited
UNITED STATES PATENTS
| | | | |
|---|---|---|---|
| 3,416,187 | 12/1968 | Charter | 17/32 |
| 3,203,037 | 8/1965 | Anhanger et al. | 17/32 |
| 3,241,178 | 3/1966 | Bridge | 17/32 |
| 3,457,587 | 7/1969 | Holly | 17/32 |

Primary Examiner—Louis G. Mancene
Assistant Examiner—D. L. Weinhold
Attorney—Axel A. Hofgren et al.

[57] ABSTRACT

A molding apparatus particularly for forming articles of moldable food material such as patties from ground meat, fish and the like in which a mold device having a plurality of mold openings for forming a plurality of the articles is moved between charging and discharging stations for these openings and there is provided at the discharging station one or a plurality of separate transporting means such as one or more endless conveyors for conveying the articles to one or a plurality of of separate destinations. One specific example of this is to have two sets of mold openings each for shaping patties and a pair of endless conveyors on which articles from the openings are deposited with one conveyor transporting the patties to one destination such as a fast freezer while the other conveyor transports its patties to a separate destination such as a cooker-canner. The width of coverage of the patties on the conveyor or conveyors is determined by the angular arrangement of the mold relative to the conveyor or conveyors.

7 Claims, 7 Drawing Figures

PATENTED AUG 7 1973  3,750,232

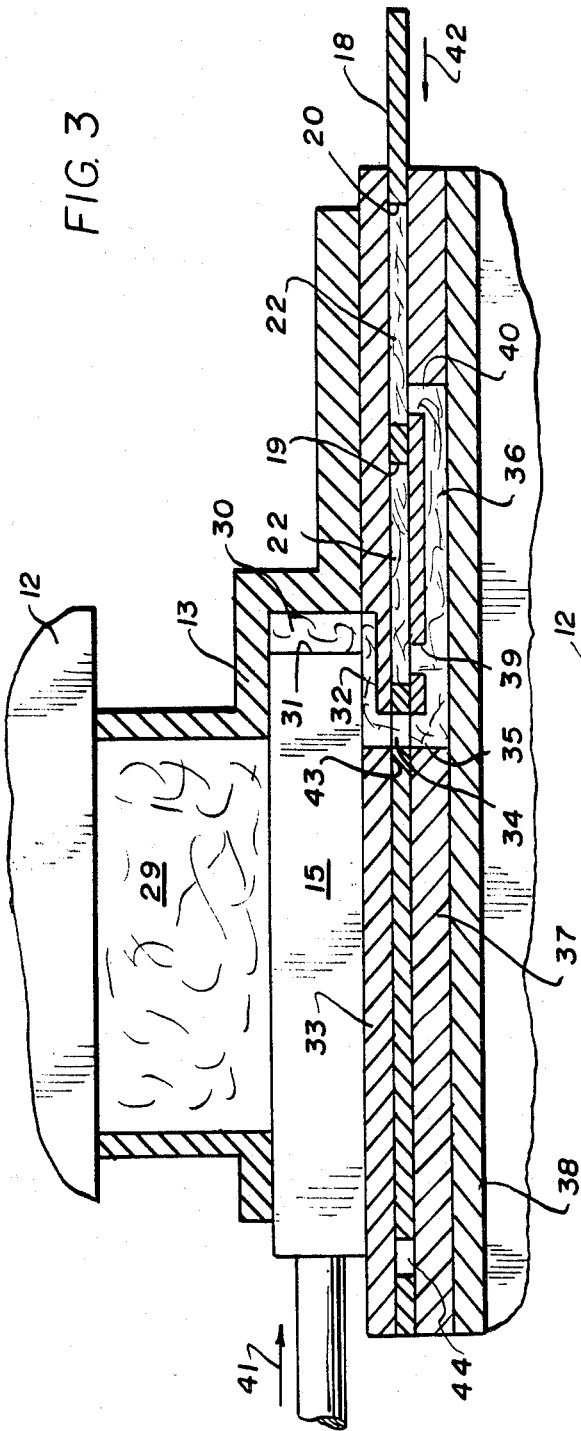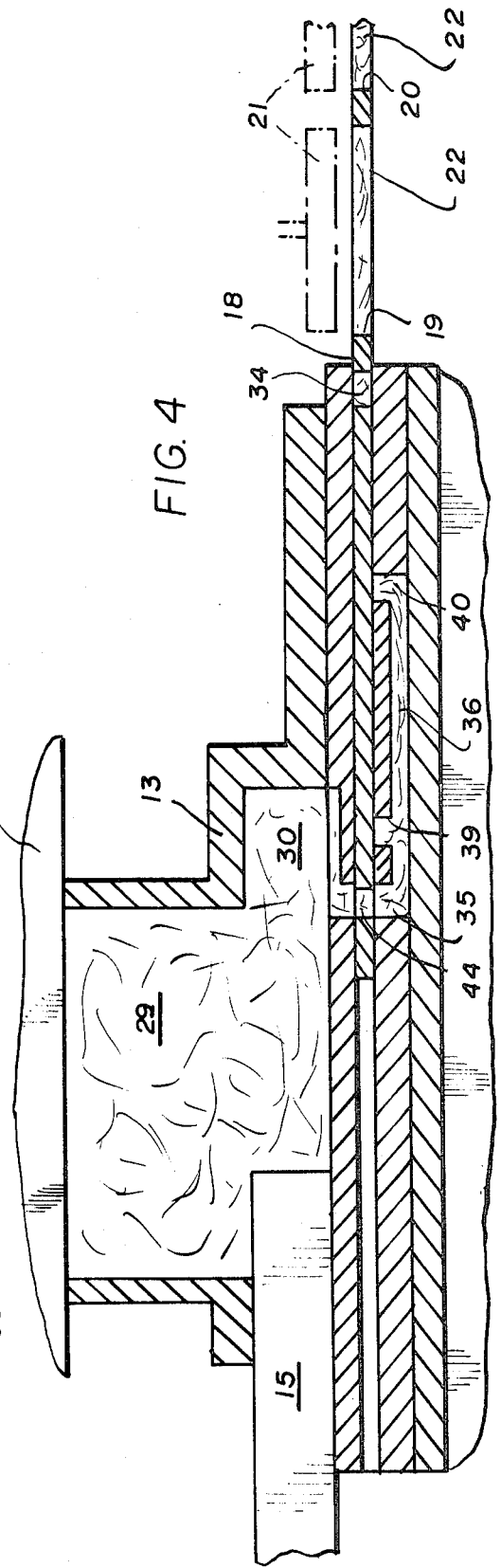

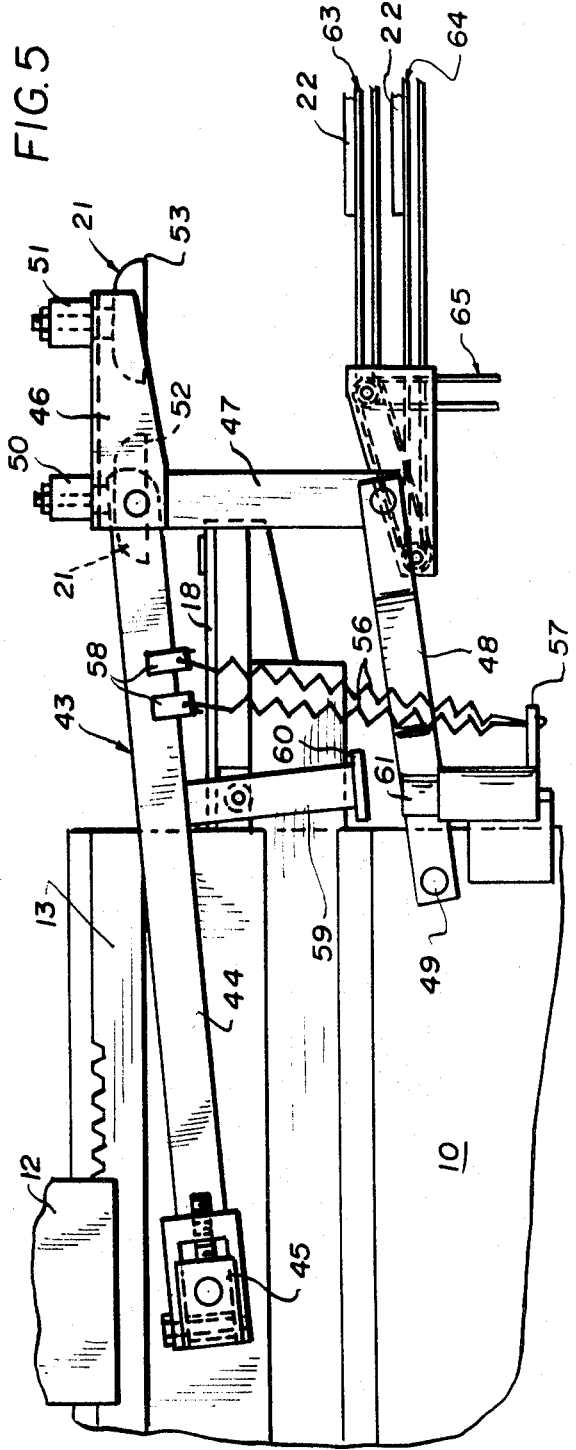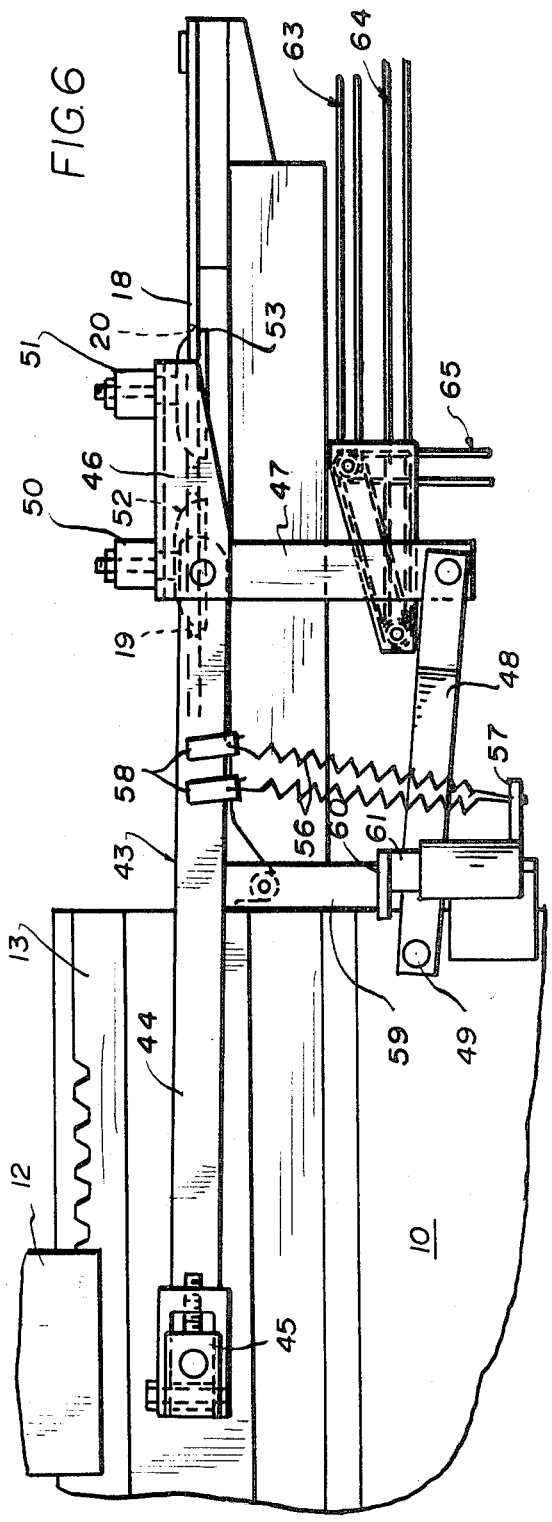

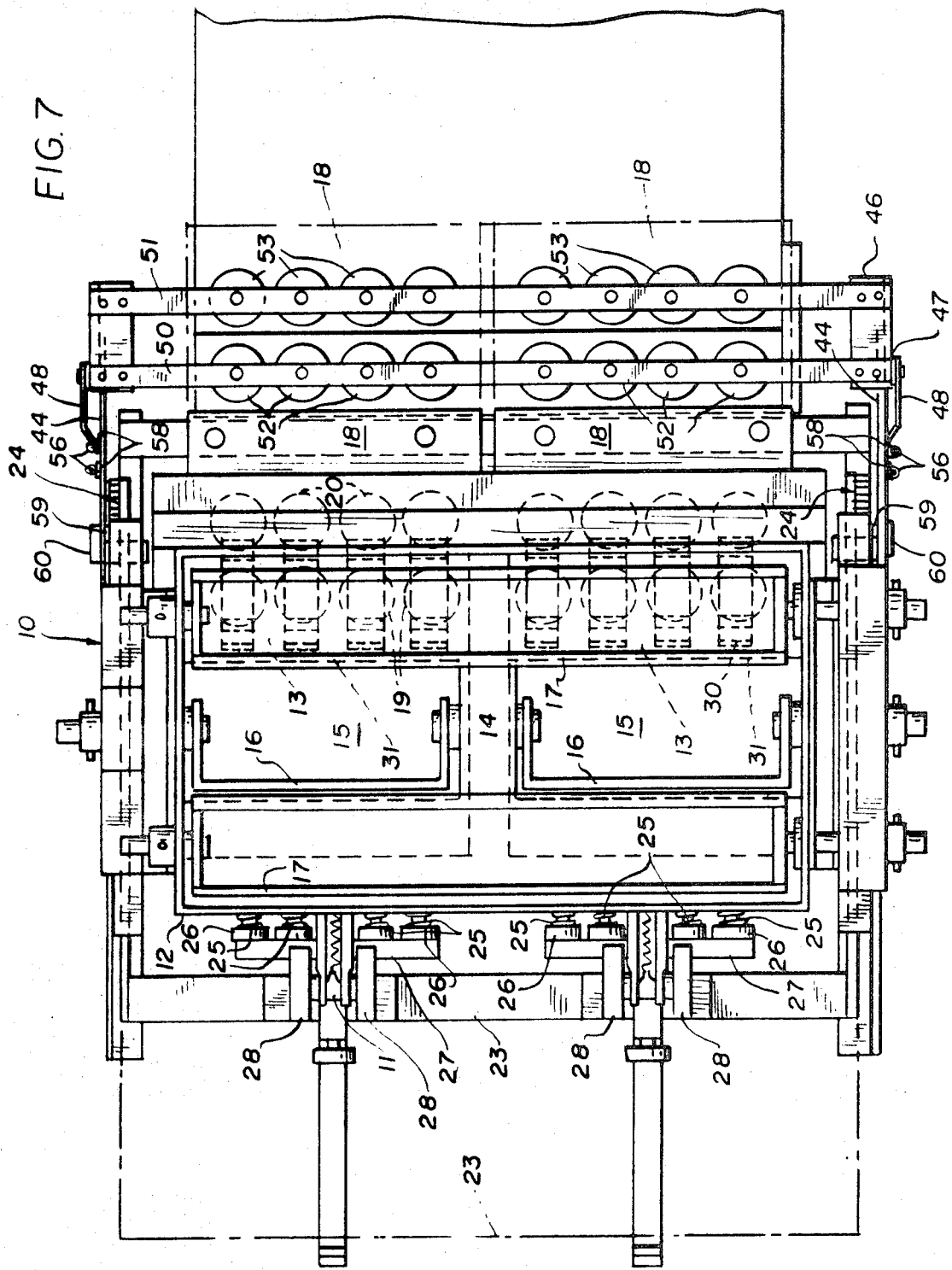

MOLDING APPARATUS

BACKGROUND OF THE INVENTION

A molding apparatus for forming a plurality of articles such as patties of ground meat simultaneously is disclosed and claimed in James A. Holly U.S. Pat. No. 3,654,665.

In a further development of this subject there is disclosed and claimed in Holly et al. Pat. application Ser. No. 178,654, filed Sept. 8, 1971, a molding apparatus in which the patties are formed in openings arranged in a plurality of transverse rows across a mold plate.

The apparatus of the present invention is also for forming simultaneously a plurality of articles from a pressure flowable plastic and moldable material such as ground food material in a plurality of transverse rows and also provides means by which each row is deposited on the same or a separate conveyor at an angle to provide rows of patties of preselected width.

BRIEF DESCRIPTION OF THE DRAWINGS

FIGS. 3 and 4 are detail sections through a portion of the apparatus.

FIG. 5 is a fragmentary side elevational view of a detail portion of the apparatus taken from the side thereof.

FIG. 6 is a view similar to FIG. 3 but with the parts shown in patty ejecting position.

FIG. 7 is a plan view of the multiple patty forming apparatus and the adjacent ends of a pair of endless conveyors.

DESCRIPTION OF THE PREFERRED EMBODIMENT

Figure 1:
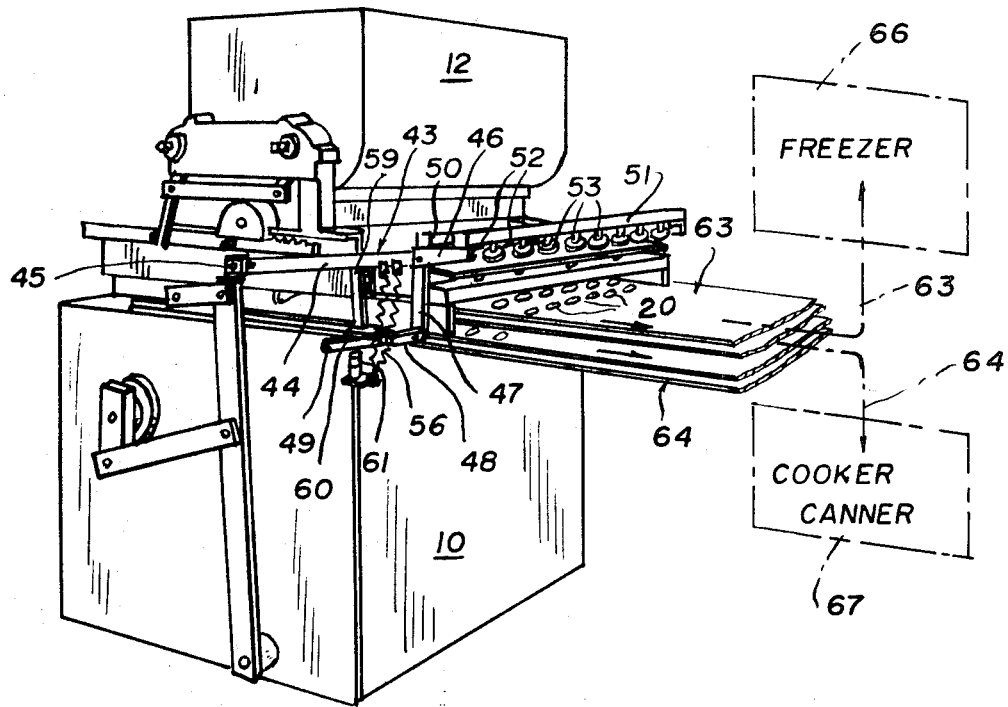
FIG. 1 is a perspective view of an apparatus with two conveyors.

The molding apparatus 10 is substantially the same as the apparatus shown, described and claimed in the above U.S. Pat. No. 3,654,665, except for an improved catch structure 11 that is embodied in an apparatus shown, described and claimed in James A. Holly U.S. Pat. No. 3,693,213. All of these patents and the application are assigned to the same assignee as the present application.

The apparatus 10 includes a hopper 12 having a bottom section 13 divided by a central partition 14 so as to provide two halves in each of which is located a horizontally reciprocable ram 15.

In order to provide for a smooth uninterrupted flow of moldable material and particularly adhesive food material such as ground meat downwardly in the hopper to the rams 15 there are provided arcuately reciprocable agitators 16 in each hopper bottom section above a ram 15 and a pair of rotatable mover devices 17 above and on opposite sides of the agitator 16. These agitators and mover devices and the operating means therefor are disclosed in detail and claimed in the above application Ser. No. 26,814.

There is provided at least one mold plate 18, and in this disclosed embodiment a pair of side-by-side mold plates, each containing a plurality of sets (here shown as two) of side-by-side mold openings 19 and 20. In the illustrated embodiment the mold openings 20 are located forwardly of the mold openings 19 so that there is thus provided two rows of eight openings for forming 16 patties simultaneously.

As is explained in more detail and claimed in the above copending applications the mold plates 18 are reciprocated between a charging station illustrated in FIGS. 3 and 7 and a discharging station shown in FIG. 4. At the discharging station there are provided two sets of the customary knockout rings illustrated schematically at 21 which are lowered simultaneously into the mold openings 19 and 20 for dislodging the formed patties 22 therefrom. As the knockout rings and the operating mechanism therefor are not essential to the present invention as claimed they are not illustrated in detail.

The mold plate or plates 18 are reciprocated from the position of FIG. 7 to the position of FIG. 3 and back again in timed sequence while at the same time the ram or rams 15 are reciprocated so that at the charging station the rams are in their forward position as shown in FIG. 3 while at the discharging station the rams 15 are at their greatest retracted position as shown in FIG. 4. The apparatus for reciprocating the ram or rams 15 which is shown in greater detail and claimed in the above U.S. Pat. No. 3,654,665 includes a horizontal bar 23 that is reciprocated by side drive racks and pinions 24 between a forwardmost position as shown in solid lines in FIG. 7 and a rearwardmost position as shown in broken lines at the left side of FIG. 7.

Also as illustrated and claimed in the above U.S. Pat. No. 3,654,665 there are provided precompressed springs 25, adjustable nut 26 for applying this precompression and cross bars 27 for each ram 15.

In order to retain each ram 15 in its forwardmost position of FIG. 3 until the mold plate has been moved forwardly away from the charging station there is provided the catch 11 and retainer 28 for each ram 15 also as described and claimed in the above application Ser. No. 26,814.

As can be seen from the above description the mold openings 19 and 20 are arranged in sets in which one opening 20 of a pair of openings 19 and 20 is located generally longitudinally forwardly of the other opening 19. The ram 15 thereupon functions as a pressure exerting part of a supply means for supplying the moldable and flowable plastic material such as ground meat 29 under pressure to the openings.

Thus, as illustrated in FIG. 3, at the charging station the ram 15 is in its forwardmost position to extend into the bottom section 13 of the hopper 12 to force material from the space 30 in front of the forward end 31 of the ram, down into and rearwardly through a channel 32 in a top plate base member 33, down through a passage means 34 in the form of a transverse slot in the mold plate 18 and into the entrance end 35 of an elongated manifold 36 in a bottom base member 37. The mold plate 18 is thereby mounted for reciprocation between the base members 33 and 37 with the bottom base member 37 being supported by a frame plate 38.

The manifold 36 has a pair of upwardly extending spaced passages 39 and 40 leading to the mold openings 19 and 20, respectively, at the rear edges thereof when the mold plate 18 has been retracted to its charging position as shown in FIG. 7. As is explained in more detail in the above U.S. Pat. No. 3,654,665 the rack and pinion drive 24 reciprocates the ram 15 forwardly as indicated by the arrow 41 while the mold plate is reciprocated rearwardly as indicated by the arrow 42. It is of course evident that in the position of FIG. 7 both the ram 15 and the mold plate 18 are temporarily stationary to provide the time interval for filling the mold openings 19 and 20.

Mounted on the sides of the apparatus are a pair of knockout apparatus 43 for removing the patties simultaneously from the extended mold plates 18 in the manner illustrated in FIG. 4. Each knockout apparatus 43 comprises a toggle arrangement including a bar 44 pivotally mounted at one end about an adjustable pivot hinge 45 and with the forward end of this bar 44 being hingedly attached to a horizontal plate 46. The end of each side plate 46 that is closer to the hopper 12 is attached to a vertical bar 47 whose lower end is hingedly attached to a second forwardly extending bar 48. This bar 48 which is beneath its corresponding first bar 44 is also hingedly mounted to the apparatus 10 about a pivot 49. The bar 48 is much higher than the bar 44 as can be seen in FIGS. 3 and 4 and thus the pivot 49 is spaced a considerable distance forwardly of the pivot 45 for the bar 44.

Extending between the rigid and generally vertically movable side horizontal plates 46 are a pair of parallel cross bars 50 and 51 on each of which is mounted a plurality, here shown as two assemblies of four each, of knockout rings 52 and 53. These knockout rings are adapted to be snapped downwardly into the corresponding mold openings 54 and 55 in the mold plates 18 when the plates are in their extending position as shown in FIG. 4.

In order to provide this sharp downward knockout motion each side bar 44 of the knockout apparatus 43 is provided with a pair of tension springs 56 with each of the two pairs of springs that are on opposite sides of the apparatus having their lower ends attached to a mounting bracket 57 and their upper ends attached to retaining clips 58 on the forward portion of the corresponding side bar 44.

In order to cushion the termination of the downward movement of the apparatus 43 each upper bar 44 is provided with a downwardly extending stop bracket 59 carrying on its lower end a transverse foot 60 that is snapped against a rubber bumper 61.

The apparatus as described forms simultaneously a plurality of articles such as the ground beef patties 22 from a pressure flowable plastic and moldable material such as the exemplary ground raw beef. The articles are formed in the movable mold such as the mold plate 18 having the plurality of mold openings 54 and 55 therein in two parallel transverse rows similar to the arrangement and spacing of the knockout rings 52 and 53.

The apparatus provides for moving the mold plate means 18 between a charging station which is the position shown in FIGS. 1, 3 and 7 and a discharging station as illustrated in FIG. 4 where the molded patties are removed. There is also provided in FIG. 1 a plurality of separate transporting means at the discharging station for transporting the articles to a plurality of separate destinations. Thus in the FIG. 1 embodiment the transporting means is illustrated by an upper endless conveyor 63 and a lower similar conveyor 64 both driven by a single drive means 65. These endless conveyors transport the articles such as the ground beef patties to a plurality of separate destinations which as illustrated in FIG. 1 may be a fast food freezer shown diagrammatically at 66 where the raw patties may be quickly frozen and a second destination being the cooker-canner also shown diagrammatically at 67.

Figure 2:
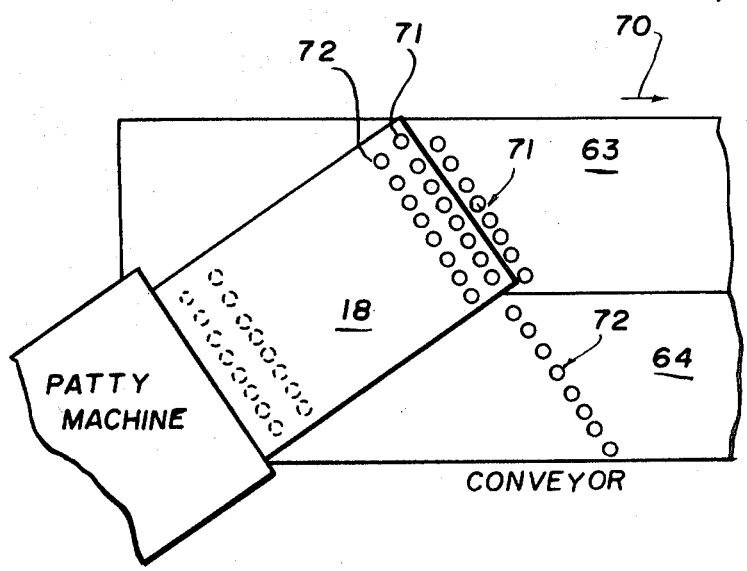
FIG. 2 is a diagrammatic fragmentary plan view of regulating the width of the deposits of patties.

As is shown diagrammatically in FIG. 2, the overall width of the deposited articles such as the double arrangement of patties can be regulated by regulating the angle of the mold plate 18 to the path of movement illustrated by the arrow 70 of the conveyor 63 or 64. Thus, in the illustrated embodiment of FIG. 2, the front row 71 of patties is deposited on the top or receiving surface of the one conveyor 63 and, because of the angular relationship which is less than 180°, the overall width of this deposit in the direction 70 is substantially equal to the width of the conveyor 63. This occurs in spite of the fact that the front row 71 of patties in the mold openings extends across a mold plate 18 width that is considerably greater than the width of the conveyor 63 receiving surface. In the same manner, the back row 72 of patties is deposited on the conveyor 64 also to cover substantially the full width thereof. In FIG. 1 the conveyors are shown vertically spaced while in FIG. 2 they are generally side-by-side.

It is of course apparent that instead of having the two conveyors 63 and 64 spaced side-by-side as shown in FIG. 2, there could be provided one overall conveyor having a total width equivalent to the sum of the widths of the individual conveyors 63 and 64.

Thus, with this invention as illustrated in FIG. 2, the overall width of each row of patties is determined solely by the angular relationship of the mold plate 18 and the path of movement 70 on the conveyor or conveyors. In one embodiment of this invention where the mold plate 18 has an overall width of 40 inches, it 13 possible with the two rows 71 and 72 of patties in the illustrated angular relationship to cover a total width of the conveyor up to about 56 inches.

Having described my invention as related to the embodiment shown in the accompanying drawings, it is my intention that the invention be not limited by any of the details of description, unless otherwise specified, but rather be construed broadly within its spirit and scope as set out in the appended claims.

I claim:

1. Molding apparatus for forming simultaneously a plurality of articles from a pressure flowable plastic and moldable material, comprising: a movable mold having a plurality of rows of transversely arranged mold opening means extending across a width of said mold for forming a plurality of said articles in said openings; means for moving said mold in a mold path between charging and discharging stations for said mold openings; supply means for supplying said material to said openings at said charging station; transporting means at said discharging station having a receiving surface for transporting said articles in a transporting path to a destination, said receiving surface having a width differing from said width of the mold opening means; transfer means at said discharging station for transferring said articles from said mold openings to said transporting means; and means for arranging said path of the movable mold and said path of said transporting means at a selected angle to deposit said articles in a pattern having a selected width on said transporting means that is substantially equal to the width of said receiving surface.

2. The apparatus of claim 1 wherein said transporting means comprises a plurality of conveyors.

3. The apparatus of claim 2 wherein there are two of said rows.

4. The apparatus of claim 3 wherein each said row is deposited on a separate conveyor.

5. The apparatus of claim 1 wherein said mold opening means are arranged in sets spaced longitudinally with respect to the direction of movement of said mold.

6. The apparatus of claim 5 wherein said transporting means comprises a plurality of conveyors each arranged to receive molded articles from different sets of said mold opening means.

7. The apparatus of claim 6 wherein said plurality of conveyors are vertically spaced from each other and have article receiving back ends horizontally spaced from each other distances corresponding to the spacing of the sets of mold openings at said discharging station.

* * * * *